(12) United States Patent
Ghannam et al.

(10) Patent No.: US 10,406,877 B2
(45) Date of Patent: Sep. 10, 2019

(54) MONITORING OF ANTI-SWAY BAR CHAINS OF TRAILER HITCH SYSTEMS

(71) Applicant: Ford Global Technologies, LLC, Dearborn, MI (US)

(72) Inventors: Mahmoud Yousef Ghannam, Canton, MI (US); David James Tippy, Ann Arbor, MI (US); Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 3 days.

(21) Appl. No.: 15/834,844

(22) Filed: Dec. 7, 2017

(65) Prior Publication Data

US 2019/0176553 A1   Jun. 13, 2019

(51) Int. Cl.
| | |
|---|---|
| *G08B 21/00* | (2006.01) |
| *B60D 1/62* | (2006.01) |
| *B60D 1/06* | (2006.01) |
| *B60D 1/30* | (2006.01) |
| *B60D 1/167* | (2006.01) |
| *B60Q 9/00* | (2006.01) |
| *B60D 1/18* | (2006.01) |

(52) U.S. Cl.
CPC ............. *B60D 1/62* (2013.01); *B60D 1/06* (2013.01); *B60D 1/167* (2013.01); *B60D 1/18* (2013.01); *B60D 1/30* (2013.01); *B60Q 9/00* (2013.01); *B60Y 2400/3012* (2013.01)

(58) Field of Classification Search
None
See application file for complete search history.

(56) References Cited

U.S. PATENT DOCUMENTS

| | | |
|---|---|---|
| RE28,590 E | 10/1975 | Salmi |
| 4,271,401 A | 6/1981 | Meo |
| 5,362,084 A | 11/1994 | Edwards |
| 6,466,028 B1 | 10/2002 | Coppinger et al. |
| 7,926,832 B1 | 4/2011 | Hall |
| 8,890,670 B2 | 11/2014 | Brey et al. |
| 9,688,111 B1 * | 6/2017 | Ghannam ............... B60D 1/07 |
| 9,738,125 B1 * | 8/2017 | Brickley ................. H04W 4/70 |
| 2008/0136139 A1 * | 6/2008 | Russell .................... B60D 1/30 280/489 |
| 2011/0115196 A1 | 5/2011 | Wulff |
| 2013/0334793 A1 | 12/2013 | LaPrade |
| 2016/0023525 A1 | 1/2016 | Lavoie |
| 2017/0225692 A1 * | 8/2017 | Ghannam ............... B60D 1/62 |

* cited by examiner

*Primary Examiner* — Julie B Lieu
(74) *Attorney, Agent, or Firm* — Frank Lollo; Neal, Gerber & Eisenberg LLP; James P. Muraff

(57) ABSTRACT

Method and apparatus are disclosed for monitoring of anti-sway bar chains of trailer hitch systems. An example disclosed trailer hitch system includes a hitch including a hitch ball to receive a trailer, an anti-sway bar extending from the hitch, anti-sway chains to couple the anti-sway bar to the trailer, sensors, and a controller. The controller is to emit an alert responsive to detecting, via the sensors, that at least one of the anti-sway chains is decoupled from at least one of the anti-sway bar and the trailer.

18 Claims, 6 Drawing Sheets

MONITORING OF ANTI-SWAY BAR CHAINS OF TRAILER HITCH SYSTEMS

TECHNICAL FIELD

The present disclosure generally relates to trailer hitch systems and, more specifically, to monitoring of anti-sway bar chains of trailer hitch systems.

BACKGROUND

Generally, vehicles include storage areas (e.g., trunks, truck beds, etc.) to store objects. In some instances, a driver and/or a passenger of the vehicle may have an object that is unable to fit within the storage area of the vehicle. In such instances, a trailer may be utilized to store and transport the object. Typically, the trailer that stores the object is connected to a rear of the vehicle to enable the vehicle to tow the trailer and the object stored within the trailer as the vehicle travels along a road.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for monitoring of anti-sway bar chains of trailer hitch systems. An example disclosed trailer hitch system includes a hitch including a hitch ball to receive a trailer, an anti-sway bar extending from the hitch, anti-sway chains to couple the anti-sway bar to the trailer, sensors, and a controller. The controller is to emit an alert responsive to detecting, via the sensors, that at least one of the anti-sway chains is decoupled from at least one of the anti-sway bar and the trailer.

In some examples, the anti-sway bar is configured to connect to the trailer via the anti-sway chains to deter the trailer from swaying as a vehicle tows the trailer. In some examples, the anti-sway bar is V-shaped. Some examples further include an exterior lamp that is positioned near the anti-sway bar. In such examples, the controller is to present the alert via the exterior lamp. In some examples, the sensors include at least one of a Hall-effect sensor, a tactile sensor, a near-field communication sensor, and a radio frequency sensor. In some examples, a portion of the sensors are configured to monitor the anti-sway chains when the trailer is coupled to a vehicle and not monitor the anti-sway chains when the trailer is decoupled from the vehicle.

Some examples further include safety chains that further couple the trailer to a vehicle and second sensors that monitor a connection of the safety chains to the trailer and the vehicle. In some such examples, when the trailer is coupled to the hitch, the controller is to emit a second alert upon detecting, via the second sensors, that the safety chains are not coupled to the trailer and the vehicle in a crisscrossing manner.

In some examples, the controller receives an ignition signal when an ignition of a vehicle is active. In some such examples, when the ignition of the vehicle is active, the controller sends a signal to emit the alert via at least one of an infotainment head unit and a mobile device in response to detecting that at least one of the anti-sway chains is decoupled from at least one of the anti-sway bar and the trailer.

Some examples further includes brackets that are configured to couple to the trailer and receive the anti-sway chains to couple the anti-sway chains to the trailer.

In some examples, the anti-sway chains include a first chain and a second chain. In some such examples, the anti-sway bar includes a first prong and a second prong. In such examples, the first chain is to couple to the first prong and the second chain is to couple to the second prong. In some such examples, the sensors include a first sensor to detect whether the first chain is coupled to the anti-sway bar, a second sensor to detect whether the second chain is coupled to the anti-sway bar, a third sensor to detect whether the first chain is coupled to the trailer, and a fourth sensor to detect whether the second chain is coupled to the trailer. Some such examples further include a first electrical circuit that is closed when the first chain is coupled to the anti-sway bar and the trailer and a second electrical circuit that is closed when the second chain is coupled to the anti-sway bar and the trailer. Some such examples further include a first resistor corresponding with the first sensor and a second resistor corresponding with the second sensor. In such examples, the first resistor has a first resistance that is different than a second resistance of the second sensor to enable the controller to detect, via the first electrical circuit and the second electrical circuit, whether the anti-sway chains are coupled in a crisscrossing manner.

In some examples, the controller further is to emit the alert responsive to detecting, via the sensors, that the anti-sway chains are coupled between the anti-sway bar and the trailer in a crisscrossing manner.

An example disclosed method includes detecting, via sensors, whether anti-sway chains are coupled between an anti-sway bar and a trailer. The anti-sway bar extends from a hitch of a vehicle. The trailer is coupled to the hitch via a hitch ball. The example disclosed method includes emitting, via a processor, an alert responsive to detecting that at least one of the anti-sway chains is decoupled from at least one of the anti-sway bar and the trailer.

Some examples further include detecting, via second sensors, whether safety chains are coupled between the trailer and the vehicle and emitting, when the trailer is coupled to the hitch, a second alert responsive to the second sensors detecting that the safety chains are not coupled to the trailer and the vehicle in a crisscrossing manner. Some examples further include emitting the alert responsive to detecting, via the sensors, that the anti-sway chains are coupled between the anti-sway bar and the trailer in a crisscrossing manner.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
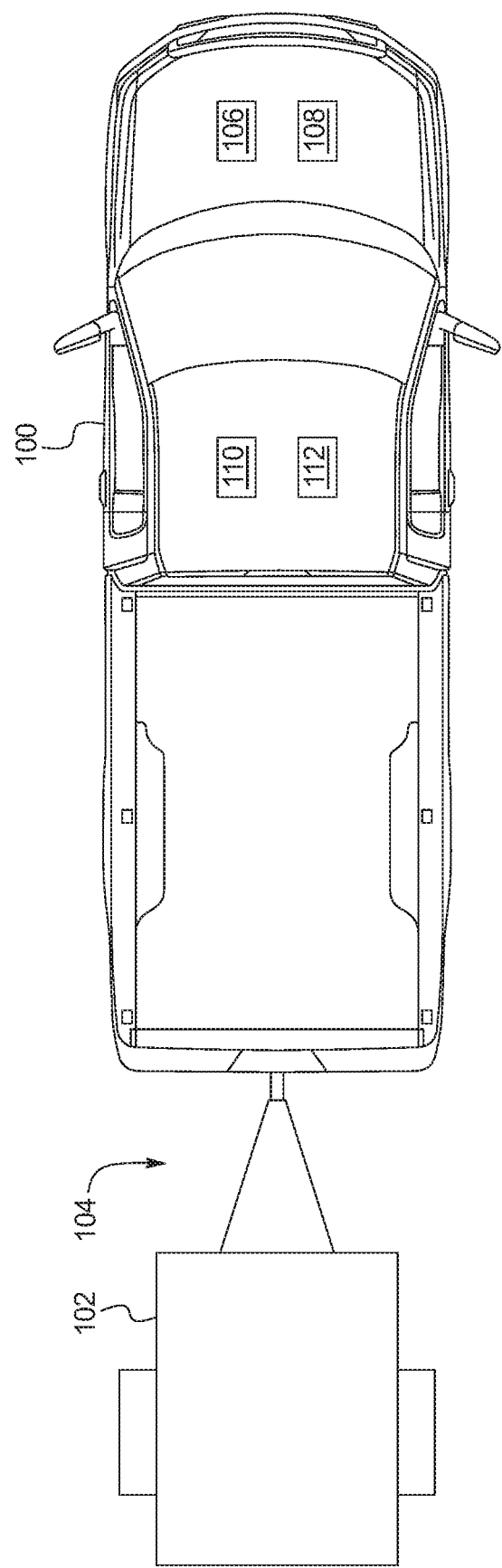
FIG. 1 illustrates an example trailer hitched to an example vehicle in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Generally, vehicles include storage areas (e.g., trunks, truck beds, etc.) to store objects. In some instances, a driver and/or a passenger of the vehicle may have an object that is unable to fit within the storage area of the vehicle. In such instances, a trailer may be utilized to store and transport the object. Typically, the trailer that stores the object is connected to a rear of the vehicle to enable the vehicle to tow the trailer and the object stored within the trailer as the vehicle travels along a road.

Some vehicles includes a hitch located at the rear of the vehicle that receives a connector of a trailer to couple the trailer to the vehicle. Further, some vehicles include safety chains, an anti-sway bar, and/or anti-sway chains that are configured to further secure the connection between the trailer and the vehicle. In some instances, a user of the vehicle and/or trailer potentially may be unaware as to whether the trailer is securely connected to the vehicle via the hitch, the safety chains, the anti-sway bar, and/or the anti-sway chains. For instance, it potentially may be difficult to visually identify a secure connection of the hitch, the safety chains, the anti-sway bar, and/or the anti-sway chains. In such instances, the user may potentially drive the vehicle when the trailer is not securely coupled to the vehicle.

Examples disclosed herein monitor anti-sway chains and/or safety chains of trailer hitch system and provide alert(s) to a user of a vehicle upon detecting that one or more of the anti-sway chains and/or safety chains is not securely connected. Example methods and apparatus disclosed herein include a trailer hitch system that monitors connections between a trailer and a vehicle. The system includes sensors that detect whether anti-sway chains are properly coupled between the trailer and an anti-sway bar of the trailer hitch system. Further, in some examples, the system includes other sensors that detect whether safety chains are properly coupled between the trailer and the vehicle. The sensors and/or the other sensors include, for example, Hall-effect sensor(s), near-field communication (NFC) device(s), radio frequency (RF) devices, and/or tactile sensor(s). The system also includes warning light(s) located near the trailer and/or a hitch of the vehicle. When the trailer is coupled to the vehicle via the hitch, the system activates the warning light(s) upon detecting that the one or more of the anti-sway chains and/or one the safety chains are not properly connected to remind a user to properly connect the anti-sway chains and/or the safety chains. In some examples, the system communicates the alert(s) to output device(s) within a cabin of the vehicle and/or a mobile device of the user when a vehicle ignition is in an on-state.

Turning to the figures, FIG. 1 illustrates an example vehicle 100 and an example trailer 102 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). The trailer 102 of the illustrated example is coupled to the vehicle 100 to transport object(s) from one location to another location. For example, the trailer 102 includes a storage area for containing object(s). A user (e.g., a driver, a passenger) may store object(s) within the storage area of the trailer 102 and couples the trailer 102 to the vehicle 100 when storage areas (e.g., trunks, flatbeds, back seats, etc.) of the vehicle 100 are unable to contain to those object(s).

As illustrated in FIG. 1, the trailer 102 couples to the vehicle 100 via a trailer hitch system 104. As disclosed in further detail below, the trailer hitch system 104 includes a hitch (e.g., a hitch 202 of FIG. 2), safety chains (e.g., safety chains 212 of FIG. 2), an anti-sway bar (e.g., an anti-sway bar 214 of FIG. 2), and anti-sway chains (e.g., anti-sway chains 216 of FIG. 2).

In the illustrated example, the vehicle 100 includes a horn 106, a communication module 108, a body control module 110, and a hitch controller 112. For example, the horn 106 is a sound-making device that emits audio signal(s) directed to a surrounding area of the vehicle 100. Oftentimes, an operator (e.g., a driver) of the vehicle 100 utilizes the horn 106 to indicate that the vehicle 100 is approaching and/or to call attention to a hazard. Additionally or alternatively, the vehicle 100 includes other sound-making device(s) that emit audio signal(s) directed to the surrounding area of the vehicle 100.

The communication module 108, for example, includes wired or wireless network interfaces to enable communication with other devices and/or external networks. The external network(s) may be a public network, such as the Internet; a private network, such as an intranet; or combinations thereof, and may utilize a variety of networking protocols now available or later developed including, but not limited to, TCP/IP-based networking protocols. The communication module 108 also includes hardware (e.g., processors, memory, storage, antenna, etc.) and software to control the wired or wireless network interfaces. For example, the communication module 108 includes one or more communication controllers for cellular networks, such as Global System for Mobile Communications (GSM), Universal Mobile Telecommunications System (UMTS), Long Term Evolution (LTE), Code Division Multiple Access (CDMA).

Additionally or alternatively, the communication module 108 includes a wired or wireless interface (e.g., an auxiliary port, a Universal Serial Bus (USB) port, a Bluetooth® wireless node, etc.) to communicatively couple with a mobile device (e.g., a smart phone, a wearable, a smart watch, a tablet, etc.). For example, the communication module 108 includes hardware and firmware to establish a wireless connection with a mobile device of a user of the vehicle 100. In some examples, the communication module 108 is a wireless personal area network (WPAN) module that wirelessly communicates with a mobile device via short-range wireless communication protocol(s). For example, the communication module 108 is configured to implement the Bluetooth® and/or Bluetooth® Low Energy (BLE) protocols. The Bluetooth® and BLE protocols are set forth in Volume 6 of the Bluetooth® Specification 4.0 (and subsequent revisions) maintained by the Bluetooth® Special Interest Group. Additionally or alternatively, the communication module 108 is configured to wirelessly communicate via Wi-Fi®, Near Field Communication (NFC), UWB (Ultra-Wide Band), and/or any other short-range and/or local wireless communication protocol (e.g., IEEE 802.11 a/b/g/n/ac) that enables the communication module 108 to communicatively couple to a mobile device.

The body control module 110 is an electronic control unit (ECU) that controls one or more subsystems throughout the vehicle 100, such as power windows, power locks, an immobilizer system, power mirrors, etc. In some examples, the body control module 110 includes circuits that drive one or more of relays (e.g., to control wiper fluid, etc.), brushed direct current (DC) motors (e.g., to control power seats, power locks, power windows, wipers, etc.), stepper motors, LEDs, etc. For example, the body control module 110 includes circuits that are configured to operate sensor(s) (e.g., sensors 222 of FIG. 2, sensors 232 of FIG. 2, a hitch sensor 520 of FIG. 5) and/or output device(s) (e.g., an exterior lamp 234 of FIG. 2, an exterior lamp 236 of FIG. 2) of the trailer hitch system 104.

Further, the hitch controller 112 of the illustrated example monitors connections between the trailer 102 and the vehicle 100. For example, the hitch controller 112 is configured to monitor a hitch ball, safety chains, an anti-sway bar, and/or anti-sway chains of the trailer hitch system 104 that are utilized to couple the trailer 102 to the vehicle 100. In response to detecting a disconnection between the trailer 102 and the vehicle 100, the hitch controller 112 emits an alert (e.g., an audio alert, a visual alert) to a user of the vehicle 100 to enable the user to establish a secure connection between the trailer 102 and the vehicle 100 via the trailer hitch system 104 before driving the vehicle 100.

Figure 2:
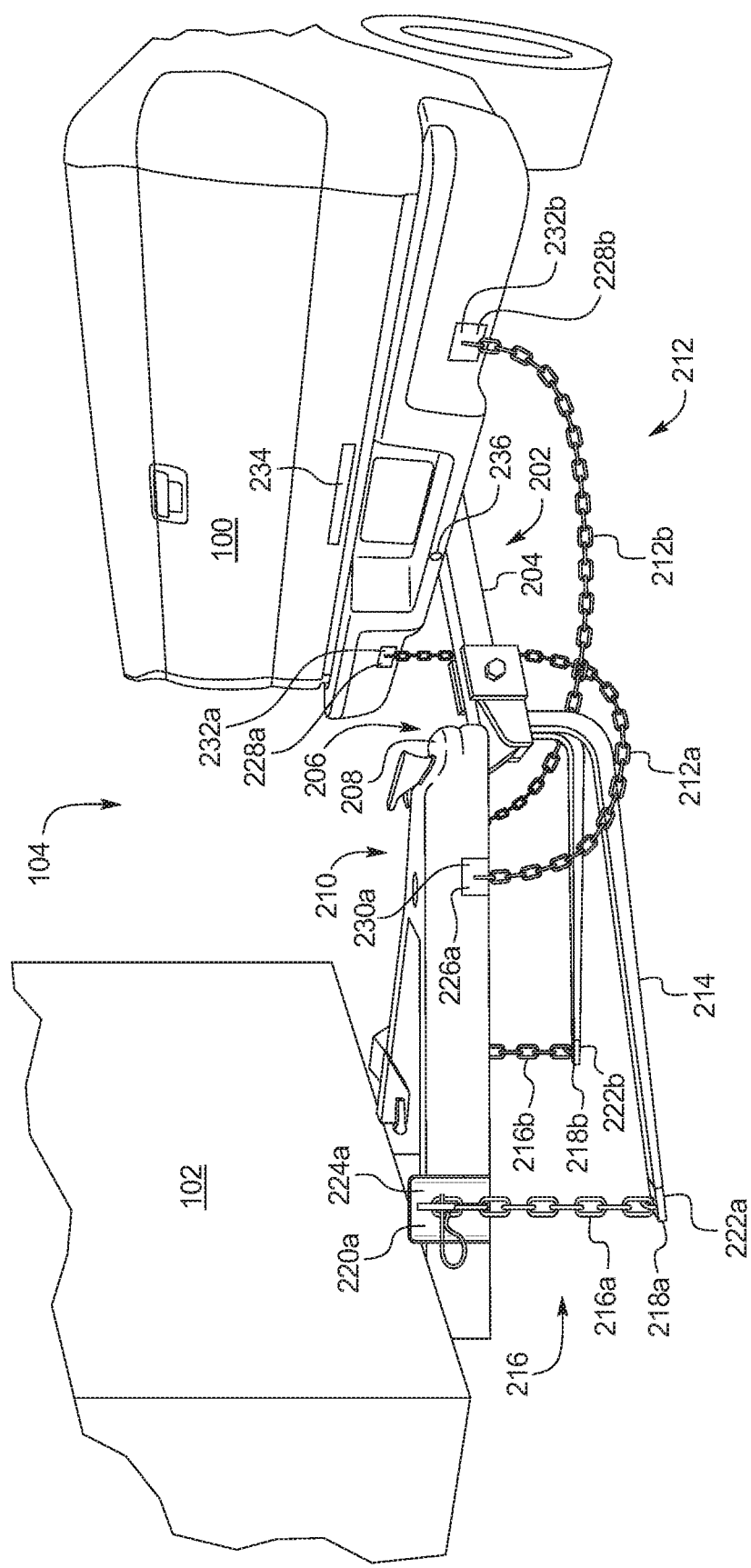
FIG. 2 illustrates an example trailer hitch system for coupling the trailer to the vehicle of FIG. 1.

FIG. 2 further illustrates the trailer hitch system 104 that is utilized to couple the trailer 102 to the vehicle 100. As illustrated in FIG. 2, the trailer hitch system 104 includes a hitch 202. In the illustrated example, the hitch 202 includes a hitch body 204 and a hitch ball 206. A first end of the hitch body 204 couples to a portion of a body (e.g., a chassis) of the vehicle 100 to couple the hitch 202 to the body of the vehicle 100. Further, the hitch ball 206 is located at an opposing second end of the hitch body 204. The hitch ball 206 is configured to receive a receiver 208 of a trailer coupler 210 of the trailer 102 to couple the trailer 102 to the vehicle 100. That is, the trailer 102 is coupled to the vehicle 100 when the receiver 208 of the trailer coupler 210 couples to the hitch ball 206 of the hitch 202.

The trailer hitch system 104 of the illustrated example also includes safety chains 212, an anti-sway bar 214, and anti-sway chains 216. As illustrated in FIG. 2, the safety chains 212 are configured to couple the trailer 102 to the vehicle 100, the anti-sway bar 214 is configured to extend from the hitch 202, and the anti-sway chains 216 are configured to couple the anti-sway bar 214 to the trailer 102.

The anti-sway bar 214 and the anti-sway chains 216 are configured to limit an amount of swaying of the trailer 102 relative to the vehicle 100 when the trailer 102 is coupled to the vehicle 100. That is, the anti-sway bar 214 and the anti-sway chains 216 dampens and/or reduces a degree of rotation that the trailer 102 is able to rotate about the hitch ball 206 of the hitch 202 as the vehicle 100 tows the trailer 102. For example, the trailer 102 may sway relative to the vehicle 100 as a result of lateral wind blowing onto the trailer 102 and/or sharp turning maneuvers performed by the vehicle 100. By limiting the amount of swaying of the trailer 102, the anti-sway bar 214 and the anti-sway chains 216 facilitate the vehicle 100 in safely towing the trailer 102.

As illustrated in FIG. 2, the anti-sway bar 214 is configured to connect to the trailer 102 via the anti-sway chains 216 to deter the trailer 102 from swaying as the vehicle 100 tows the trailer 102. In the illustrated example, the anti-sway bar 214 is rotatably coupled to the hitch 202 adjacent to (e.g., below) the hitch ball 206. For example, the anti-sway bar 214 is rotatably coupled to the hitch 202 to reduce a stress of the connection between the anti-sway bar 214 and the hitch 202. Further, in the illustrated example, the anti-sway bar 214 is V-shaped. For example, a nadir of the anti-sway bar 214 extends from the hitch 202, and opposing ends of the anti-sway bar 214 include connection points 218 (e.g., first connection points) for receiving first ends of the anti-sway chains 216. Additionally, the trailer 102 includes connection points 220 (e.g., second connection points) for receiving opposing second ends of the anti-sway chains 216. As illustrated in FIG. 2, the anti-sway chains 216 are configured to couple between the anti-sway bar 214 and the trailer 102 in a non-crisscrossing manner to deter the trailer 102 from swaying as the vehicle 100 tows the trailer 102.

In the illustrated example, the anti-sway chains 216 include an anti-sway chain 216a (e.g., a first chain) and an anti-sway chain 216b (e.g., a second chain), the connection points 218 include a connection point 218a on a first side of the anti-sway bar 214 and a connection point 218b on a second side of the anti-sway bar 214, and the connection points 220 include a connection point 220a on a first side of the trailer 102 and a connection point 220b (not shown in FIG. 2) on a second side of the trailer 102. To deter the trailer 102 from swaying, the anti-sway chains 216 are to couple between the connection points 218, 220 in a non-crisscrossing manner. For example, the anti-sway chain 216a is configured to couple between the connection points 218a, 220a, and the anti-sway chain 216b is configured to couple between the connection points 218b, 220b. Additionally or alternatively, the anti-sway chain 216b is configured to couple between the connection points 218a, 220a, and the anti-sway chain 216a is configured to couple between the connection points 218b, 220b.

As illustrated in FIG. 2, the trailer hitch system 104 includes sensors to monitor a connection of the anti-sway chains 216. For example, the trailer hitch system 104 includes sensors 222 (also referred to as anti-sway chain sensors) to detect whether the anti-sway chains 216 are coupled to the connection points 218 of the anti-sway bar 214 and sensors 224 (also referred to as anti-sway chain sensors) to detect whether the anti-sway chains 216 are coupled to the connection points 220 of the trailer 102. In the illustrated example, the sensors 222 include a sensor 222a (e.g., a first sensor) and a sensor 222b (e.g., a second sensor), and the sensors 224 include a sensor 224a (e.g., a third sensor) and a sensor 224b (e.g., a fourth sensor) (not shown in FIG. 2). For example, the sensor 222a is configured to detect whether the anti-sway chain 216a is coupled to the connection point 218a of the anti-sway bar 214, the sensor 222b is configured to detect whether the anti-sway chain 216b is coupled to the connection point 218b of the anti-sway bar 214, the sensor 224a is configured to detect whether the anti-sway chain 216a is coupled to the connection point 220a of the trailer 102, and the sensor 224b is configured to detect whether the anti-sway chain 216b is coupled to the connection point 220b of the trailer 102.

In the illustrated example, the sensors 222 include Hall-effect sensor(s), tactile sensor(s) near-field communication (NFC) sensor(s), radio frequency (RF) sensor(s), and/or any other sensor(s) that are configured to detect when the anti-sway chains 216 are securely coupled to the connection points 218 of the anti-sway bar 214. Further, the sensors 224 include Hall-effect sensor(s), tactile sensor(s) near-field communication (NFC) sensor(s), radio frequency (RF) sensor(s), and/or any other sensor(s) that are configured to detect when the anti-sway chains 216 are securely coupled to the connection points 220 of the trailer 102.

In some examples, the sensors 222 of the anti-sway bar 214 continuously receive power from a power source of the vehicle 100 when the anti-sway bar 214 is coupled to the vehicle 100. That is, the sensors 222 are connected to the power source via wires when the anti-sway bar 214 is coupled to the hitch 202 and the hitch 202 is coupled to the body of the vehicle 100. Further, in some examples, the sensors 224 of the trailer 102 receive power from the power source of the vehicle 100 when the trailer 102 is coupled to the vehicle 100 via the receiver 208 and the hitch ball 206. For example, electrical components of the trailer 102 receive power from the power source of the vehicle 100 via electrical connectors of the trailer 102 and the vehicle 100 that are connected when the trailer coupler 210 of the trailer 102 is coupled to the hitch 202 of the vehicle 100. In such examples, a portion of the sensors of the trailer hitch system 104 (e.g., the sensors 224) are powered to monitor the anti-sway chains 216 when the trailer 102 is coupled to the vehicle 100 via the hitch 202 and are not powered to monitor the anti-sway chains 216 when the trailer 102 is decoupled from the hitch 202.

In the illustrated example, the safety chains 212 are utilized to further couple the trailer 102 to the vehicle 100. For example, the safety chains 212 are configured to connect between the trailer 102 and the vehicle 100 in a crisscrossing manner beneath the hitch 202 to couple the trailer 102 to the vehicle 100. The safety chains 212 are connected in a crisscrossing manner to strengthen the connection between the trailer 102 and vehicle 100 via the safety chains 212. In some examples, if the receiver 208 of the trailer coupler 210 decouples from the hitch ball 206, the trailer 102 remains coupled to the vehicle 100 via the safety chains 212 when the safety chains 212 are coupled between the trailer 102 and the vehicle 100 in a crisscrossing manner.

As illustrated in FIG. 2, the trailer 102 includes connection points 226 for receiving ends of the safety chains 212, and the vehicle 100 includes connection points 228 adjacent to the hitch 202 for receiving opposing ends of the safety chains 212. In the illustrated example, the safety chains 212 include a safety chain 212a and a safety chain 212b, the connection points 226 include a connection point 226a on a first side of the trailer 102 and a connection point 226b (not shown in FIG. 2) on a second side of the trailer 102, and the connection points 228 include a connection point 228a toward a second side of the vehicle 100 and a connection point 228b toward a first side of the vehicle 100. To securely couple the trailer 102 to the vehicle 100, the safety chains 212 are to couple between the connection points 226 of the trailer 102 and the connection points 228 of the vehicle 100 in a non-crisscrossing manner. For example, the safety chain 212a is configured to couple between the connection points 226a, 228a, and the safety chain 212b is configured to couple between the connection points 226b, 228b. Additionally or alternatively, the safety chain 212b is configured to couple between the connection points 226a, 228a, and the safety chain 212a is configured to couple between the connection points 226b, 228b.

Further, the trailer hitch system 104 of the illustrated example includes sensors (e.g., second sensors) to monitor a connection of the safety chains 212. For example, the trailer hitch system 104 includes sensors 230 (also referred to as safety chain sensors) to detect whether the safety chains 212 are coupled to the connection points 226 of the trailer and sensors 232 (also referred to as safety chain sensors) to detect whether the safety chains 212 are coupled to the connection points 228 of the vehicle 100. In the illustrated example, the sensors 230 include a sensor 230a and a sensor 230b (not shown in FIG. 2), and the sensors 232 include a sensor 232a and a sensor 232b. For example, the sensor 230a is configured to detect whether the safety chain 212a is coupled to the connection point 226a of the trailer 102, the sensor 230b is configured to detect whether the safety chain 212b is coupled to the connection point 226b of the trailer 102, the sensor 232a is configured to detect whether the safety chain 212a is coupled to the connection point 228a of the vehicle 100, and the sensor 232b is configured to detect whether the safety chain 212b is coupled to the connection point 228b of the vehicle 100.

In the illustrated example, the sensors 230 include Hall-effect sensor(s), tactile sensor(s) near-field communication (NFC) sensor(s), radio frequency (RF) sensor(s), and/or any other sensor(s) that are configured to detect when the safety chains 212 are securely coupled to the connection points 226 of the trailer 102. Further, the sensors 232 include Hall-effect sensor(s), tactile sensor(s) near-field communication (NFC) sensor(s), radio frequency (RF) sensor(s), and/or any other sensor(s) that are configured to detect when the safety chains 212 are securely coupled to the connection points 228 of the vehicle 100.

Further, in some examples, the sensors 232 of the vehicle 100 continuously receive power from a power source of the vehicle 100. Additionally, in some examples, the sensors 230 of the trailer 102 receive power from the power source of the vehicle 100 when the trailer 102 is coupled to the vehicle 100 via the receiver 208 and the hitch ball 206. In such examples, a portion of the sensors of the trailer hitch system 104 (e.g., the sensors 230) are powered to monitor the safety chains 212 when the trailer 102 is coupled to the vehicle 100 via the hitch 202 and are not powered to monitor the safety chains 212 when the trailer 102 is decoupled from the hitch 202.

As illustrated in FIG. 2, the trailer hitch system 104 includes an exterior lamp 234 (e.g., a first exterior lamp). For example, the exterior lamp 234 is positioned near the anti-sway bar 214 and is configured to emit visual alert when one or more of the anti-sway chains 216 is improperly coupled between the anti-sway bar 214 and the trailer 102. That is, the exterior lamp 234 is to emit the visual alert when one or more of the sensors 222, 224 detect that (1) one or more of the anti-sway chains 216 is decoupled from the anti-sway bar 214 and/or the trailer 102 and/or (2) the anti-sway chains 216 are coupled between the anti-sway bar 214 and the trailer 102 in a crisscrossing manner. In the illustrated example, the exterior lamp 234 is located along a rear surface of the vehicle 100 adjacent to the hitch 202 to enable a user to view the visual alert when the user is coupling the trailer 102 to the vehicle 100. Further, in some examples, the exterior lamp 234 emits another visual alert (e.g., different than the visual alert for the anti-sway chains 216) when one or more of the sensors 230, 232 detect an improper connection of one or more of the safety chains 212.

That is, the exterior lamp 234 is to emit the other visual alert when one or more of the sensors 230, 232 detect that (1) one or more of the safety chains 212 is decoupled from the trailer 102 and/or the vehicle 100 and/or (2) the safety chains 212 are coupled between the trailer 102 and the vehicle 100 in a non-crisscrossing manner.

In the illustrated example, the trailer hitch system 104 includes another exterior lamp 236 (e.g., a second exterior lamp) that is positioned near the hitch 202 along the rear surface of the vehicle 100. The exterior lamp 236 is configured to emit a visual alert upon detection that one or more of the safety chains 212 is improperly coupled between the trailer 102 and the vehicle 100, and the exterior lamp 234 is configured to emit a visual alert upon detection that one or more of the anti-sway chains 216 is improperly coupled between the anti-sway bar 214 and the trailer 102.

In operation, the hitch controller 112 monitors the anti-sway chains 216 and/or the safety chains 212 via the sensors 222, 224 and/or the sensors 230, 232, respectively, of the trailer hitch system 104. Further, the hitch controller 112 emits alert(s) in response to detecting one or more of the anti-sway chains 216 and/or one or more of the safety chains 212 are decoupled and/or improperly coupled. For example, the hitch controller 112 emits a visual alert via the exterior lamp 234, a visual alert via the exterior lamp 236, and/or an audio alert via the horn 106 in response to detecting a decoupled and/or improperly coupled chain of the trailer hitch system 104.

For example, the hitch controller 112 emits a first alert responsive to (1) the sensors 222 and the sensors 224 detecting that the anti-sway chains 216 are coupled between the anti-sway bar 214 and the trailer 102 in a crisscrossing manner, (2) one or more of the sensors 222 detecting that one or more of the anti-sway chains 216 is decoupled from the anti-sway bar 214, and/or (3) one or more of the sensors 224 detecting that one or more of the anti-sway chains 216 is decoupled from the trailer 102. Additionally or alternatively, the hitch controller 112 emits a second alert responsive to (1) the sensors 230 and the sensors 232 detecting that the safety chains 212 are coupled between the trailer 102 and the vehicle 100 in a non-crisscrossing manner, (2) one or more of the sensors 230 detecting that one or more of the safety chains 212 is decoupled from the trailer 102, and/or (3) one or more of the sensors 232 detecting that one or more of the safety chains 212 is decoupled from the vehicle 100.

In some examples, the sensors 224 and the sensors 230 of the trailer 102 are powered to monitor the anti-sway chains 216 and the safety chains 212, respectively, when the trailer 102 is coupled to the vehicle 100 via the hitch 202. In such examples, the hitch controller 112 is configured to emit the alerts only when the trailer 102 is coupled to the vehicle 100 via the hitch 202.

Further, in some examples, the hitch controller 112 is configured to emit audio and/or visual alert via an infotainment head unit (e.g., an infotainment head unit 502 of FIG. 5) of the vehicle 100 upon receiving an ignition signal when an ignition of the vehicle 100 is active. The hitch controller 112 emits alert(s) via the infotainment head unit when the ignition is active to warn an operator and/or passenger located within a cabin of the vehicle 100 that a chain of the trailer hitch system 104 is improperly connected. For example, when the ignition of the vehicle 100 is active, the hitch controller 112 sends a signal to emit an alert via the infotainment head unit in response to detecting that (1) the anti-sway chains 216 are coupled between the anti-sway bar 214 and the trailer 102 in a crisscrossing manner, (2) one or more of the anti-sway chains 216 is decoupled from the anti-sway bar 214, (3) one or more of the anti-sway chains 216 is decoupled from the trailer 102, (4) the safety chains 212 are coupled between the trailer 102 and the vehicle 100 in a non-crisscrossing manner, (5) one or more of the safety chains 212 is decoupled from the trailer 102, and/or (6) one or more of the safety chains 212 is decoupled from the vehicle 100. Additionally or alternatively, the hitch controller 112 is configured to send a signal to the communication module 108 when the ignition is active to relay the alert to a mobile device of the user. That is, when the ignition of the vehicle 100 is active, the hitch controller 112 sends a signal to a mobile device of the user via the communication module 108 in response to detecting that one or more of the safety chains 212 and/or one or more of the anti-sway chains 216 is improperly coupled and/or decoupled.

Figure 3:
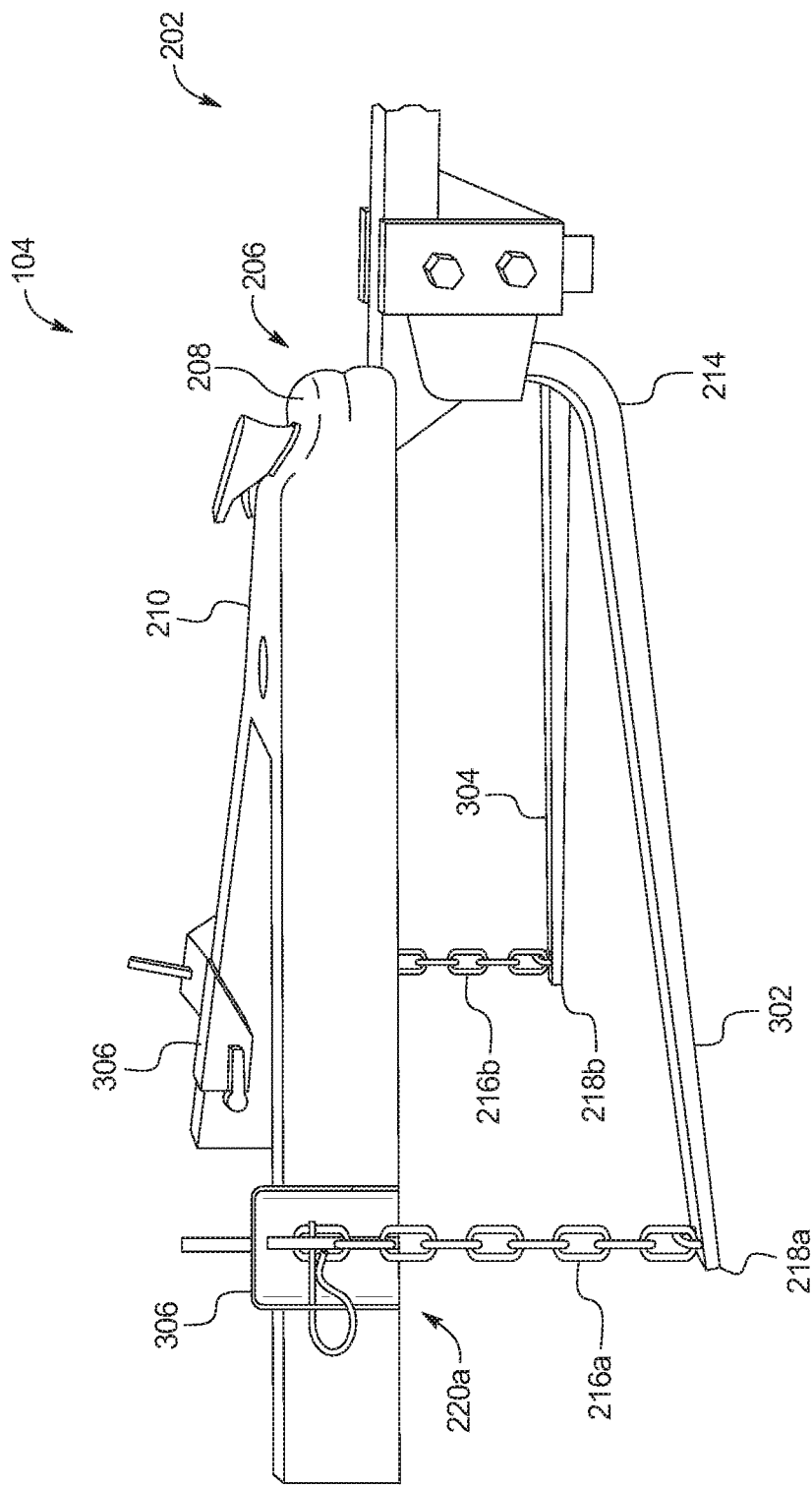
FIG. 3 illustrates example anti-sway bars and anti-sway chains of the trailer hitch system of FIG. 2.

FIG. 3 further illustrates the anti-sway bar 214 and the anti-sway chains 216 of the trailer hitch system 104. As illustrated in FIG. 3, the receiver 208 of the trailer coupler 210 couples to the hitch ball 206 of the hitch 202 to couple the trailer 102 to the vehicle 100. The anti-sway chain 216a couples to the connection point 218a and the connection point 220a to couple to the anti-sway bar 214 and a frame of the trailer 102, respectively. Further, the anti-sway chain 216b couples to the connection point 218b and the connection point 220b to couple to the anti-sway bar 214 and the frame of the trailer 102, respectively.

As illustrated in FIG. 3, the anti-sway bar 214 is V-shaped and includes a prong 302 (e.g., a first prong) and another prong 304 (e.g., a second prong). The connection point 218a is located at an end of the prong 302 to enable the anti-sway chain 216a to couple to the prong 302, and the connection point 218b is located at an end of the prong 304 to enable the anti-sway chain 216b to couple to the prong 304.

Further, the trailer hitch system 104 of the illustrated example includes brackets 306 that are configured to couple to the frame of the trailer 102. Further, the brackets 306 are configured to receive the anti-sway chains 216 to couple the anti-sway chains 216 to the trailer 102 when the brackets 306 are coupled to the trailer 102. For example, one of the brackets 306 includes the connection point 220a to which the anti-sway chain 216a is configured to couple, and another of the brackets 306 includes the connection point 220b to which the anti-sway chain 216b is configured to couple.

Figure 4:
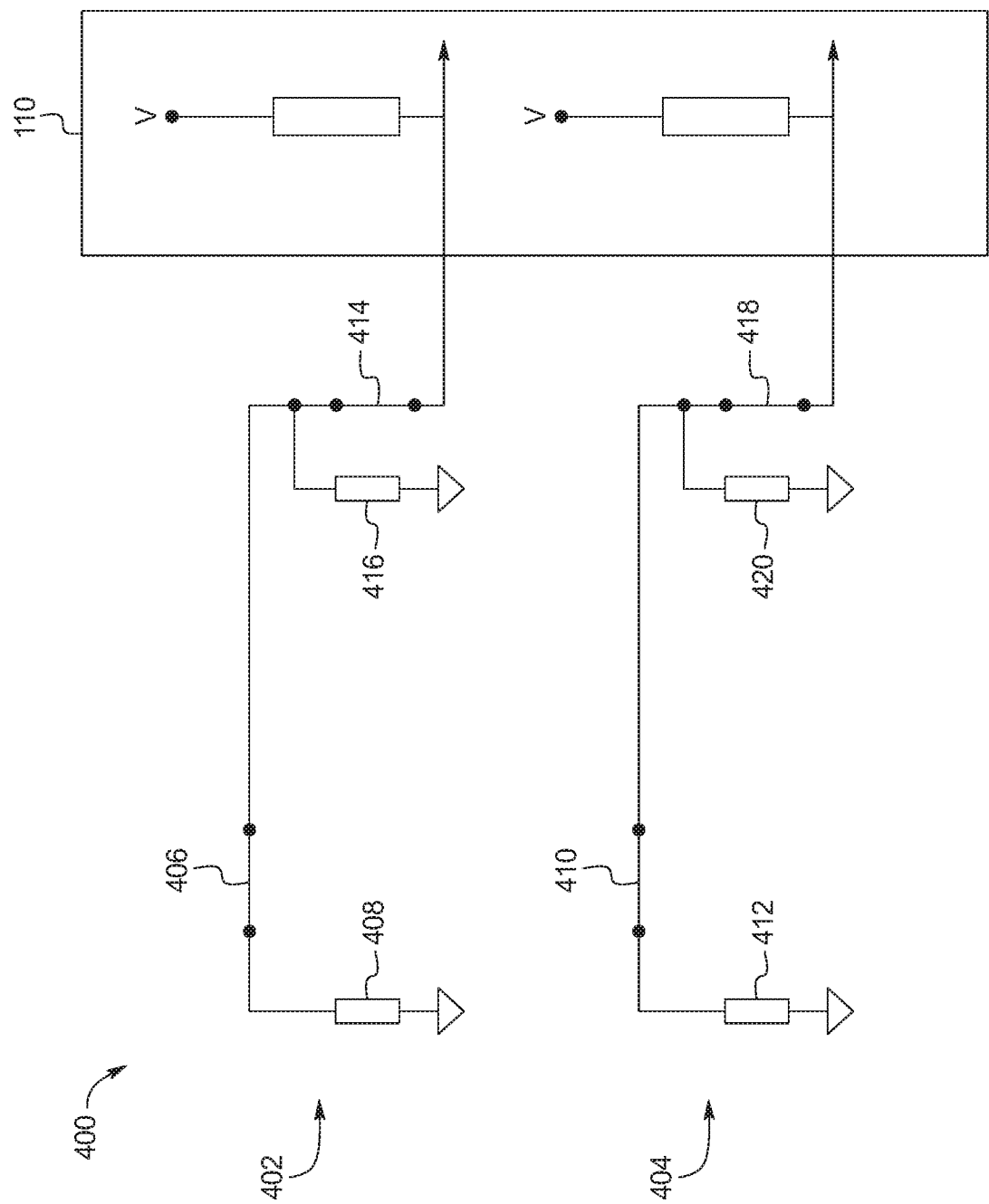
FIG. 4 depicts an electrical circuit for monitoring the anti-sway chains of FIG. 3 and/or safety chains.

FIG. 4 depicts a circuit 400 that is utilized by the hitch controller 112 for monitoring the anti-sway chains 216 and/or the safety chains 212. As illustrated in FIG. 4, the circuit 400 includes a first electrical circuit 402 and a second electrical circuit 404 that are connected to the body control module 110 of the vehicle 100 such that the body control module 110 receives a first output of the first electrical circuit 402 and a second output from the second electrical circuit 404. The first electrical circuit 402 includes a first switch 406 and a first resistor 408 that correspond with a first sensor of the trailer hitch system 104, and the second electrical circuit 404 includes a second switch 410 and a second resistor 412 that correspond with a second sensor of the trailer hitch system 104. Further, the first electrical circuit 402 includes a third switch 414 and a third resistor 416 that correspond with a third sensor of the trailer hitch system 104, and the second electrical circuit 404 includes a fourth switch 418 and a fourth resistor 420 that correspond with a fourth sensor of the trailer hitch system 104.

In examples in which the circuit 400 is utilized by the hitch controller 112 to monitor the anti-sway chains 216, the first switch 406 and the first resistor 408 correspond with the sensor 222a, the second switch 410 and the second resistor 412 correspond with the sensor 222b, the third switch 414 and the third resistor 416 correspond with the sensor 224a, and the fourth switch 418 and the fourth resistor 420 correspond with the sensor 224b. The first switch 406 is open when the sensor 222a does not detect one of the anti-sway chains 216 and is closed when the sensor 222a detects one of the anti-sway chains 216. The second switch 410 is open when the sensor 222b does not detect one of the anti-sway chains 216 and is closed when the sensor 222b detects one of the anti-sway chains 216. The third switch 414 is open when the sensor 224a does not detect one of the anti-sway chains 216 and is closed when the sensor 224a detects one of the anti-sway chains 216. Further, the fourth switch 418 is open when the sensor 224b does not detect one of the anti-sway chains 216 and is closed when the sensor 224b detects one of the anti-sway chains 216. In turn, the first electrical circuit 402 is closed when one of the anti-sway chains 216 (e.g., the anti-sway chain 216a) is coupled to the anti-sway bar 214 and the trailer 102. For example, the hitch controller 112 detects when one of the anti-sway chains 216 is decoupled from the anti-sway bar 214 and/or the trailer 102 in response to detecting that the first electrical circuit 402 and/or the second electrical circuit 404 is open.

Further, in some examples, the first resistor 408 corresponding with the sensor 222a has a first resistance that is different than a second resistance of the second resistor 412 that corresponds with the sensor 222b to enable the hitch controller 112 to determine whether the anti-sway chains 216 are connected in a crisscrossing manner or a non-crisscrossing manner. For example, when the anti-sway chains 216 are connected in a non-crisscrossing manner, the first resistor 408 is connected in series with the third resistor 416 and the second resistor 412 is connected in series with the fourth resistor 420. When the anti-sway chains 216 are connected in a crisscrossing manner, the first resistor 408 is connected in series with the fourth resistor 420 and the second resistor 412 is connected in series with the third resistor 416. Because the first resistance of the first resistor 408 is different than the second resistance of the second resistor 412, the circuit 400 enables the hitch controller 112 to detect, via the sensors 222 and the sensors 224, whether the anti-sway chains 216 are connected in a crisscrossing manner or a non-crisscrossing manner.

Additionally or alternatively, the third resistor 416 corresponding with the sensor 224a has a third resistance that is different than a fourth resistance of the fourth resistor 420 that corresponds with the sensor 224b to enable the hitch controller 112 to determine whether the anti-sway chains 216 are connected in a crisscrossing manner or a non-crisscrossing manner. That is, because the third resistance of the third resistor 416 is different than the fourth resistance of the fourth resistor 420, the circuit 400 enables the hitch controller 112 to detect, via the sensors 222 and the sensors 224, whether the anti-sway chains 216 are connected in a crisscrossing manner or a non-crisscrossing manner.

Similarly, the circuit 400 enables the hitch controller 112 to detect, via the sensors 230 and the sensors 232, whether the safety chains 212 are disconnected, connected in a crisscrossing manner, and/or connected in a non-crisscrossing manner. In examples in which the circuit 400 is utilized by the hitch controller 112 to monitor the safety chains 212, the first switch 406 and the first resistor 408 correspond with the sensor 230a, the second switch 410 and the second resistor 412 correspond with the sensor 230b, the third switch 414 and the third resistor 416 correspond with the sensor 232a, and the fourth switch 418 and the fourth resistor 420 correspond with the sensor 232b. The hitch controller 112 detects when one of the safety chains 212 is decoupled from the trailer 102 and/or the vehicle 100 in response to detecting that the first electrical circuit 402 and/or the second electrical circuit 404 is open. Further, because the first resistance of the first resistor 408 is different than the second resistance of the second resistor 412 and/or the third resistance of the third resistor 416 is different than the fourth resistance of the fourth resistor 420, the circuit 400 enables the hitch controller 112 to detect, via the sensors 230 and the sensors 232, whether the safety chains 212 are connected in a crisscrossing manner or a non-crisscrossing manner.

Figure 5:
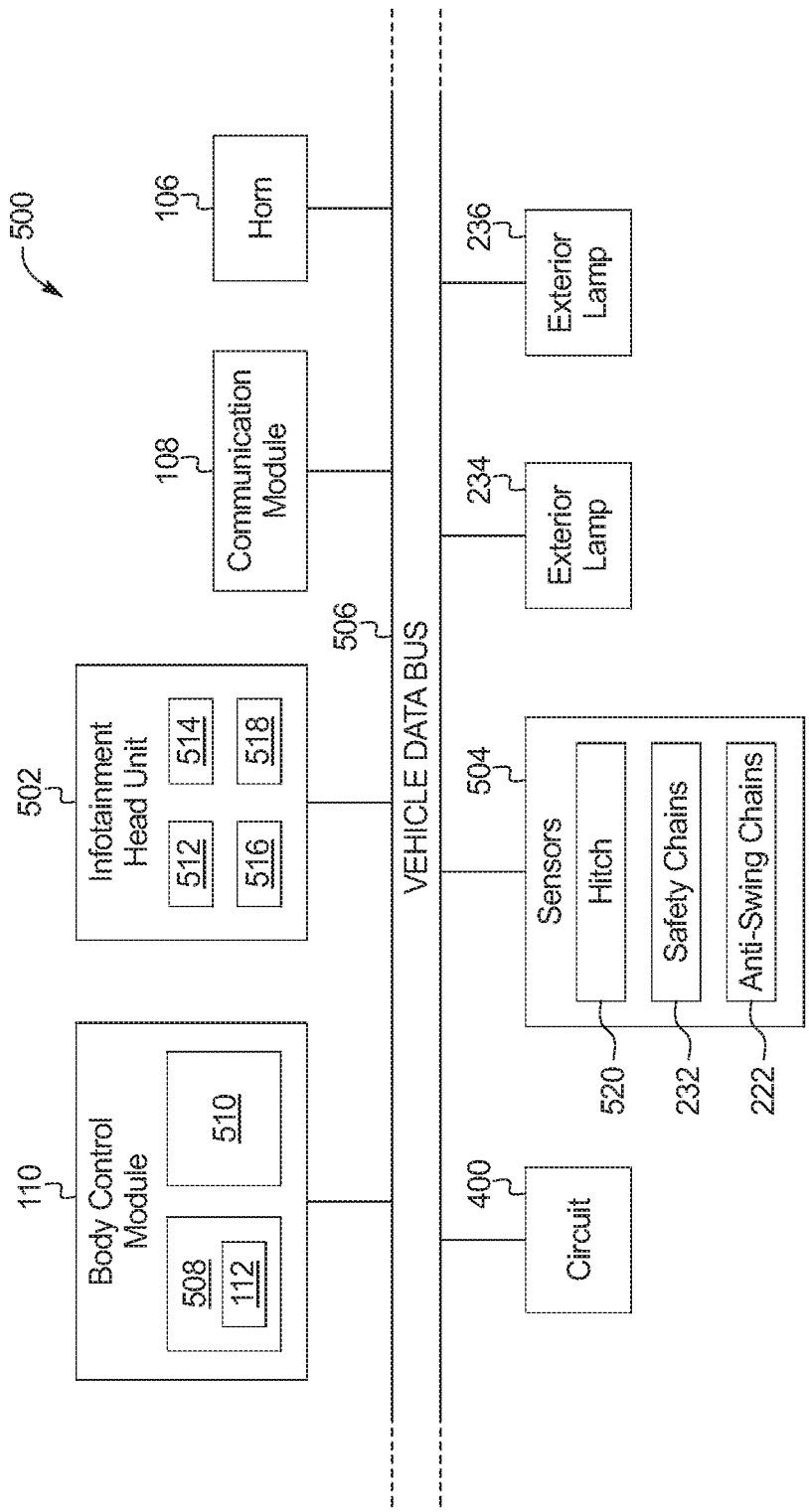
FIG. 5 is a block diagram of electronic components of the vehicle and the trailer of FIG. 1.

FIG. 5 is a block diagram of electronic components 500 of the vehicle and the trailer of FIG. 1. As illustrated in FIG. 5, the electronic components 500 include the body control module 110, an infotainment head unit 502, the communication module 108, the horn 106, the circuit 400, sensors 504, the exterior lamp 234, the exterior lamp 236, and a vehicle data bus 506.

The body control module 110 includes a microcontroller unit, controller or processor 508 and memory 510. In some examples, the processor 508 of the body control module 110 is structured to include the hitch controller 112. Alternatively, in some examples, the hitch controller 112 is incorporated into another electronic control unit (ECU) with its own processor 508 and memory 510. The processor 508 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 510 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 510 includes multiple kinds of memory, particularly volatile memory and non-volatile memory.

The memory 510 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 510, the computer readable medium, and/or within the processor 508 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 502 provides an interface between the vehicle 100 and a user. The infotainment head unit 502 includes digital and/or analog interfaces (e.g., input devices and output devices) to receive input from and display information for the user(s). The input devices include, for example, a control knob, an instrument panel, a digital camera for image capture and/or visual command recognition, a touch screen, an audio input device (e.g., cabin microphone), buttons, or a touchpad. The output devices may include a cluster output 512, a cluster output 514, other instrument cluster output(s) (e.g., dials, lighting devices), actuators, a display 516 (e.g., a heads-up display and/or a center console display such as a liquid crystal display (LCD), an organic light emitting diode (OLED) display, a flat panel display, a solid state display, etc.), and/or speakers 518. For example, the cluster output 512 is configured to emit a visual alert when one or more of the anti-sway chains 216 is decoupled and/or improperly coupled, the cluster output 514 is configured to emit a visual alert when one or more of the safety chains 212 is decoupled and/or improperly coupled, the display 516 is configured to emit visual alert(s) when one or more of the safety chains 212 and/or is the anti-sway chains 216 decoupled and/or improperly coupled, and the speakers 518 are configured to emit audio alert(s) when one or more of the safety chains 212 and/or is the anti-sway chains 216 decoupled and/or improperly coupled. Further, in the illustrated example, the infotainment head unit 502 includes hardware (e.g., a processor or controller, memory, storage, etc.) and software (e.g., an operating system, etc.) for an infotainment system (such as SYNC® and MyFord Touch® by Ford®). Additionally, the infotainment head unit 502 displays the infotainment system on, for example, the display 516.

The sensors 504 are arranged in and around the vehicle 100 (e.g., including the hitch 202) to monitor properties of the vehicle 100, the trailer 102, and/or an environment in which the vehicle 100 and/or the trailer 102 is located. One or more of the sensors 504 may be mounted to measure properties around an exterior of the vehicle 100. Additionally or alternatively, one or more of the sensors 504 may be mounted inside a cabin of the vehicle 100 or in a body of the vehicle 100 (e.g., an engine compartment, wheel wells, etc.) to measure properties in an interior of the vehicle 100. For example, the sensors 504 include accelerometers, odometers, tachometers, pitch and yaw sensors, wheel speed sensors, microphones, tire pressure sensors, biometric sensors and/or sensors of any other suitable type.

In the illustrated example, the sensors 504 include a hitch sensor 520, the safety chain sensors 232, and the anti-sway chain sensors 222. For example, the hitch sensor 520 detects when the receiver 208 of the trailer coupler 210 is coupled to the hitch ball 206 of the hitch 202. The safety chain sensors 232 detect when one or more of the safety chains 212 is decoupled from and/or improperly coupled to the vehicle 100. The anti-sway chain sensors 222 detect when one or more of the anti-sway chains 216 is decoupled from and/or improperly coupled to the anti-sway bar 214 of the vehicle 100.

Further, the safety chain sensors 230 and the anti-sway chain sensors 224 of the trailer 102 are electrically coupled to the vehicle data bus 506 when the trailer 102 is coupled to the vehicle 100 via the hitch ball 206 of the hitch 202. The safety chain sensors 230 detect when one or more of the safety chains 212 is decoupled from and/or improperly coupled to the trailer 102. The anti-sway chain sensors 224 detect when one or more of the anti-sway chains 216 is decoupled from and/or improperly coupled to the trailer 102.

The vehicle data bus 506 communicatively couples the horn 106, the communication module 108, the body control module 110, the exterior lamp 234, the exterior lamp 236, the circuit 400, the infotainment head unit 502, and the sensors 504. In some examples, the vehicle data bus 506 includes one or more data buses. The vehicle data bus 506 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 6:
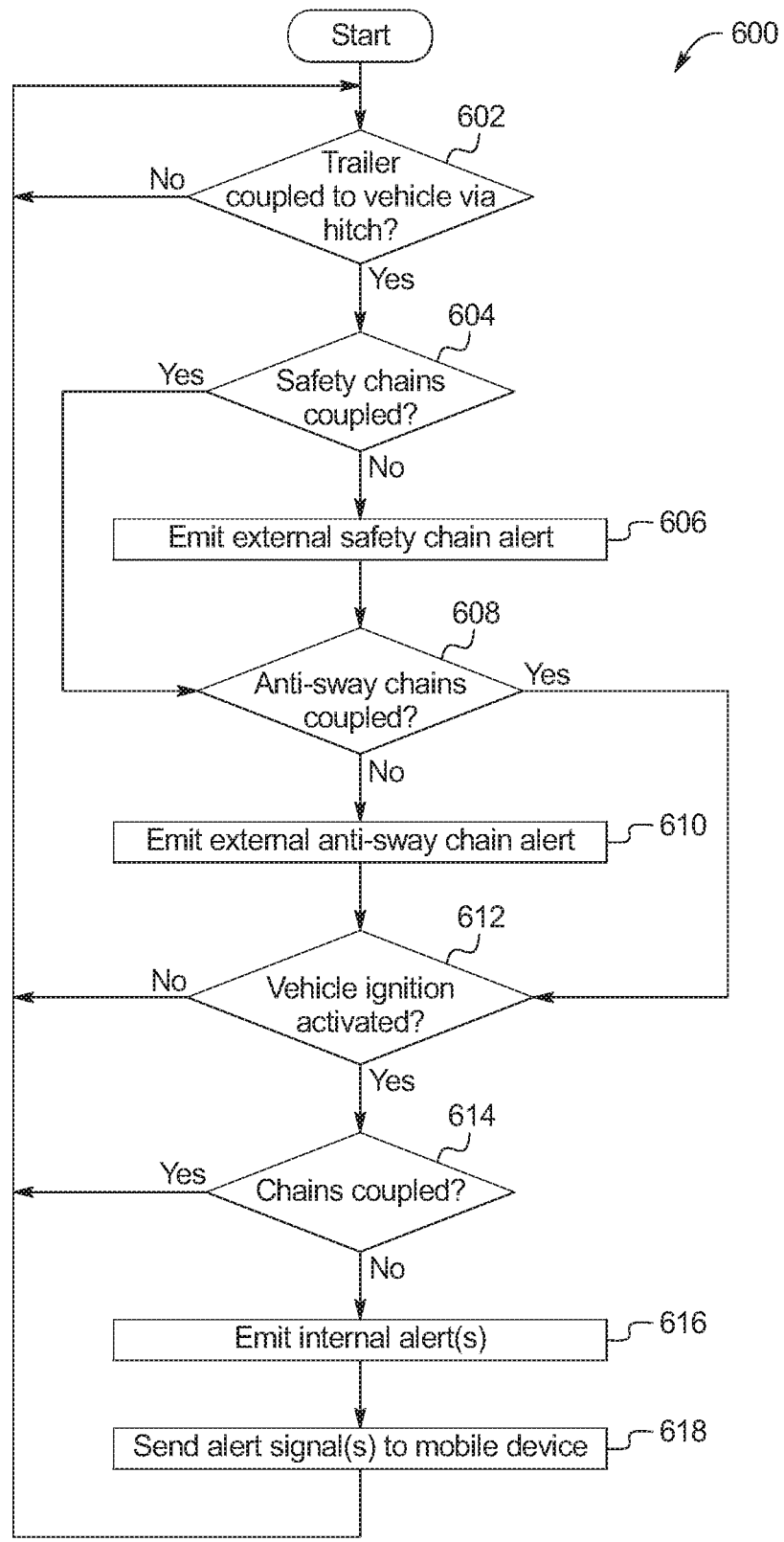
FIG. 6 is a flowchart for monitoring anti-sway bar chains of a trailer hitch system in accordance with the teachings herein.

FIG. 6 is a flowchart of an example method 600 to monitor anti-sway bar chains of a trailer hitch system. The flowchart of FIG. 6 is representative of machine readable instructions that are stored in memory (such as the memory 510 of FIG. 5) and include one or more programs which, when executed by a processor (such as the processor 508 of FIG. 5), cause the vehicle 100 to implement the example hitch controller 112 of FIGS. 1 and 5. While the example program is described with reference to the flowchart illustrated in FIG. 6, many other methods of implementing the example hitch controller 112 may alternatively be used. For example, the order of execution of the blocks may be rearranged, changed, eliminated, and/or combined to perform the method 600. Further, because the method 600 is disclosed in connection with the components of FIGS. 1-5, some functions of those components will not be described in detail below.

Initially, at block 602, the hitch controller 112 determines whether the trailer 102 is coupled to the vehicle 100 via the hitch 202 (e.g., via the hitch sensor 520). In response to the hitch controller 112 determining that the trailer 102 is not coupled to the vehicle 100 via the hitch 202, the method 600 remains at block 602. Otherwise, in response to the hitch controller 112 determining that the trailer 102 is coupled to the vehicle 100 via the hitch 202, the method 600 proceeds to block 604.

At block 604, the hitch controller 112 determines whether the safety chains 212 are properly coupled between the trailer 102 and the vehicle 100. For example, the hitch controller 112 determines that the safety chains 212 are properly connected in response to detecting, via the sensors 230 and the sensors 232, that the safety chains 212 are connected between the trailer 102 and the vehicle 100 in a crisscrossing manner. The hitch controller 112 determines that the safety chains 212 are improperly connected in response to detecting, via the sensors 230 and the sensors 232, that (1) one or more of the safety chains 212 is decoupled from the trailer 102, (2) one or more of the safety chains 212 is decoupled from the vehicle 100, and/or (3) the safety chains 212 are connected between the trailer 102 and the vehicle 100 in a non-crisscrossing manner. In response to the hitch controller 112 detecting that the safety chains 212 are properly coupled, the method 600 proceeds to block 608. Otherwise, in response to the hitch controller 112 detecting that the safety chains 212 are not properly coupled, the method 600 proceeds to block 606 at which the hitch controller 112 emits an external safety chain alert. For example, the hitch controller 112 emits a visual alert via the exterior lamp 234, a visual alert via the exterior lamp 236, and/or an audio alert via the horn 106.

At block 608, the hitch controller 112 determines whether the anti-sway chains 216 are properly coupled between the anti-sway bar 214 and the trailer 102. For example, the hitch controller 112 determines that the anti-sway chains 216 are properly connected in response to detecting, via the sensors 222 and the sensors 224, that the anti-sway chains 216 are connected between the anti-sway bar 214 and the trailer 102 in a non-crisscrossing manner. The hitch controller 112 determines that the anti-sway chains 216 are improperly connected in response to detecting, via the sensors 222 and the sensors 224, that (1) one or more of the anti-sway chains 216 is decoupled from the anti-sway bar 214, (2) one or more of the anti-sway chains 216 is decoupled from the trailer 102, and/or (3) the anti-sway chains 216 are connected between the anti-sway bar 214 and the trailer 102 in a crisscrossing manner. In response to the hitch controller 112 detecting that the anti-sway chains 216 are properly coupled, the method 600 proceeds to block 612. Otherwise, in response to the hitch controller 112 detecting that the anti-sway chains 216 are not properly coupled, the method 600 proceeds to block 610 at which the hitch controller 112 emits an external anti-sway chain alert. For example, the hitch controller 112 emits a visual alert via the exterior lamp 234 and/or an audio alert via the horn 106.

At block 612, the hitch controller 112 determines whether a vehicle ignition is activated. For example, the hitch controller 112 receives an ignition signal when the vehicle ignition is active. In response to the hitch controller 112 determining that vehicle ignition is not active, the method 600 returns to block 602. Otherwise, in response to the hitch controller 112 determining that vehicle ignition is active, the method 600 proceeds to block 614.

At block 614, the hitch controller 114 determines whether the chains of the trailer hitch system 104 (i.e., safety chains 212 and the anti-sway chains 216) are properly coupled. In response to the hitch controller 114 determining that the chains are properly coupled, the method 600 returns to block 602. Otherwise, in response to the hitch controller 114 determining that the chains are not properly coupled, the method 600 proceeds to block 616 at which the hitch controller 114 emits internal alert(s) within a cabin of the vehicle 100. For example, the hitch controller 114 emits alert(s) via the cluster output 512, the cluster output 514, the display 516, and/or the speakers 518 of the infotainment head unit 502 to indicate to a user located within the cabin of the vehicle 100 that one or more of the safety chains 212 and/or one or more of the anti-sway chains is improperly coupled. At block 618, the hitch controller 112 sends alert signal(s) to a mobile device of the user to indicate to the user that one or more of the safety chains 212 and/or one or more of the anti-sway chains is improperly coupled. For example, the hitch controller 112 sends alert signal(s) to the communication module 108, and the communication module relays the alert signal(s) to the mobile device.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively. Additionally, as used herein, the terms "module," "unit," and "node" refer to hardware with circuitry to provide communication, control and/or monitoring capabilities, often in conjunction with sensors. A "module," a "unit," and a "node" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A trailer hitch system, comprising:
   a hitch of a vehicle including a hitch ball to receive a trailer;
   an anti-sway bar extending from the hitch;
   anti-sway chains to couple the anti-sway bar to the trailer;
   sensors, wherein a portion of the sensors are located on the trailer and configured to
   monitor the anti-sway chains only when the portion of the sensors located on the trailer is electrically coupled to a power source of the vehicle, wherein the portion of the sensors located on the trailer is electrically coupled to the power source via wires when the trailer is coupled to the hitch; and
   not monitor the anti-sway chains when the trailer is decoupled from the vehicle; and
   a controller to emit an alert responsive to detecting, via the sensors, that at least one of the anti-sway chains is decoupled from at least one of the anti-sway bar and the trailer.

2. The trailer hitch system of claim 1, wherein the anti-sway bar is configured to connect to the trailer via the anti-sway chains to deter the trailer from swaying as the vehicle tows the trailer.

3. The trailer hitch system of claim 1, wherein the anti-sway bar is V-shaped.

4. The trailer hitch system of claim 1, further including an exterior lamp that is positioned near the anti-sway bar, the controller is to present the alert via the exterior lamp.

5. The trailer hitch system of claim 1, wherein the sensors include at least one of a Hall-effect sensor, a tactile sensor, a near-field communication sensor, and a radio frequency sensor.

6. The trailer hitch system of claim 1, further including:
   safety chains that further couple the trailer to the vehicle; and
   second sensors that monitor a connection of the safety chains to the trailer and the vehicle.

7. The trailer hitch system of claim 6, wherein, when the trailer is coupled to the hitch, the controller is to emit a second alert upon detecting, via the second sensors, that the safety chains are not coupled to the trailer and the vehicle in a crisscrossing manner.

8. The trailer hitch system of claim 1, wherein the controller receives an ignition signal when an ignition of the vehicle is active.

9. The trailer hitch system of claim 8, wherein, when the ignition of the vehicle is active, the controller sends a signal to emit the alert via at least one of an infotainment head unit and a mobile device in response to detecting that at least one of the anti-sway chains is decoupled from at least one of the anti-sway bar and the trailer.

10. The trailer hitch system of claim 1, further including brackets that are configured to:
    couple to the trailer; and
    receive the anti-sway chains to couple the anti-sway chains to the trailer.

11. The trailer hitch system of claim 1, wherein the anti-sway chains include a first chain and a second chain.

12. The trailer hitch system of claim 11, wherein the anti-sway bar includes a first prong and a second prong, the first chain is to couple to the first prong and the second chain is to couple to the second prong.

13. The trailer hitch system of claim 1, wherein the controller further is to emit the alert responsive to detecting, via the sensors, that the anti-sway chains are coupled between the anti-sway bar and the trailer in a crisscrossing manner.

14. A trailer hitch system, comprising:
a hitch including a hitch ball to receive a trailer;
an anti-sway bar extending from the hitch;
anti-sway chains including a first chain and a second chain to couple the anti-sway bar to the trailer;
sensors including a first sensor to detect whether the first chain is coupled to the anti-sway bar, a second sensor to detect whether the second chain is coupled to the anti-sway bar, a third sensor to detect whether the first chain is coupled to the trailer, and a fourth sensor to detect whether the second chain is coupled to the trailer; and
a controller to emit an alert responsive to detecting, via the sensors, that at least one of the anti-sway chains is decoupled from at least one of the anti-sway bar and the trailer.

15. The trailer hitch system of claim 14, wherein a portion of the sensors are configured to:
monitor the anti-sway chains when the trailer is coupled to a vehicle; and
not monitor the anti-sway chains when the trailer is decoupled from the vehicle.

16. The trailer hitch system of claim 14, further including a first electrical circuit that is closed when the first chain is coupled to the anti-sway bar and the trailer and a second electrical circuit that is closed when the second chain is coupled to the anti-sway bar and the trailer.

17. The trailer hitch system of claim 16, further including a first resistor corresponding with the first sensor and a second resistor corresponding with the second sensor, the first resistor having a first resistance that is different than a second resistance of the second sensor to enable the controller to detect, via the first electrical circuit and the second electrical circuit, whether the anti-sway chains are coupled in a crisscrossing manner.

18. A system, comprising:
a hitch for a trailer;
an anti-sway bar extending from the hitch;
anti-sway chains to couple the anti-sway bar to the trailer;
a hitch sensor configured to detect when the trailer is coupled to the hitch;
anti-sway sensors configured to:
monitor the anti-sway chains in response to the hitch sensor detecting that when the trailer is coupled to the hitch; and
not monitor the anti-sway chains in response to the hitch sensor detecting that when the trailer is decoupled from the hitch; and
a controller to emit an alert responsive to detecting, via the anti-sway sensors, that at least one of the anti-sway chains is decoupled.

* * * * *